United States Patent
Koga (10) Patent No.: US 10,078,918 B2
(45) Date of Patent: Sep. 18, 2018

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kazuhiro Koga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/296,889

(22) Filed: Oct. 18, 2016

(65) Prior Publication Data
US 2017/0109937 A1   Apr. 20, 2017

(30) Foreign Application Priority Data
Oct. 20, 2015  (JP) ................................. 2015-206453

(51) Int. Cl.
| | | |
|---|---|---|
| G09G 5/14 | (2006.01) | |
| G06T 19/00 | (2011.01) | |
| G06F 3/00 | (2006.01) | |
| G02B 27/01 | (2006.01) | |
| G06T 7/70 | (2017.01) | |

(52) U.S. Cl.
CPC ........ G06T 19/006 (2013.01); G02B 27/0172 (2013.01); G02B 27/0179 (2013.01); G06F 3/005 (2013.01); G06T 7/70 (2017.01); *G02B 2027/014* (2013.01); *G02B 2027/0138* (2013.01); *G06T 2207/30244* (2013.01)

(58) Field of Classification Search
CPC .................................................. G06T 19/006
USPC ......................................................... 345/633
See application file for complete search history.

(56) References Cited

U.S. PATENT DOCUMENTS

| | | | |
|---|---|---|---|
| 9,104,271 B1* | 8/2015 | Adams ................. | G06F 3/0426 |
| 2002/0041339 A1* | 4/2002 | Diepold .................... | G06T 7/20 348/700 |
| 2002/0106206 A1* | 8/2002 | Takeshita ............. | H04N 1/6077 396/429 |
| 2002/0109701 A1* | 8/2002 | Deering .................. | G06T 15/00 345/581 |

(Continued)

FOREIGN PATENT DOCUMENTS

JP           2003-70006 A       3/2003

Primary Examiner — Javid A Amini
(74) Attorney, Agent, or Firm — Canon U.S.A., Inc. IP Division (57) ABSTRACT

An information processing apparatus configured to generate an image to be displayed on a display device including an image capturing unit includes, an image acquisition unit configured to acquire a captured image obtained by the image capturing unit, an estimation unit configured to estimate a position and an orientation of the image capturing unit based on the captured image, a first generation unit configured to generate an image of a virtual object based on the estimated position and orientation of the image capturing unit, a moving velocity acquisition unit configured to acquire a moving velocity of the image capturing unit, a second generation unit configured to generate an image representing the moving velocity, and a display control unit configured to cause the display device to display a composite image obtained by combining the image of the virtual object and the image generated by the second generation unit.

14 Claims, 7 Drawing Sheets

(56) References Cited

U.S. PATENT DOCUMENTS

| | | | | |
|---|---|---|---|---|
| 2002/0140696 | A1* | 10/2002 | Futamura | A63F 13/10 345/419 |
| 2006/0061567 | A1* | 3/2006 | Ouchi | G06T 13/20 345/419 |
| 2006/0146002 | A1* | 7/2006 | Nagata | G09G 3/3611 345/101 |
| 2007/0136041 | A1* | 6/2007 | Sheridan | G09B 9/05 703/8 |
| 2008/0143820 | A1* | 6/2008 | Peterson | G06T 3/4038 348/36 |
| 2010/0020068 | A1* | 1/2010 | House | G06T 15/20 345/419 |
| 2011/0013087 | A1* | 1/2011 | House | A63B 24/0021 348/564 |
| 2011/0063163 | A1* | 3/2011 | Kojima | G01S 7/066 342/179 |
| 2012/0002112 | A1* | 1/2012 | Huang | H04N 5/144 348/579 |
| 2012/0133676 | A1* | 5/2012 | Kitahara | H04N 5/23293 345/633 |
| 2013/0162632 | A1* | 6/2013 | Varga | G06T 19/006 345/419 |
| 2014/0226041 | A1* | 8/2014 | Eguchi | H04N 5/23229 348/239 |
| 2014/0254951 | A1* | 9/2014 | Salvador | G06T 5/003 382/255 |
| 2015/0084951 | A1* | 3/2015 | Boivin | H04N 5/272 345/419 |
| 2015/0199458 | A1* | 7/2015 | Bacon | G06F 17/5009 703/8 |
| 2017/0103581 | A1* | 4/2017 | Mullins | G06T 19/006 |
| 2017/0163905 | A1* | 6/2017 | Baltz | H04N 5/2621 |
| 2017/0177941 | A1* | 6/2017 | Mullins | G06K 9/00671 |

* cited by examiner

| SHUTTER SPEED(sec) | THRESHOLD(degree/sec) |
|---|---|
| 1/60 | 23 |
| 1/100 | 35 |
| 1/120 | 46 |
| 1/240 | 69 |

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

A technique relating to Mixed Reality (hereinafter, referred to as "MR") for mixing a virtual space with a real space has conventionally been known. In an MR system, computer graphics (hereinafter, referred to as "CG"), representing a virtual object, are displayed on an image of the real space captured by an image capturing unit, so that a user can experience the virtual object as if it is actually present there. To display a virtual object at an expected position and in an expected orientation, geometric consistency is necessary between the virtual object and the real space.

A known video see-through head mounted display (HMD) is a system employing MR. In an MR technique using the video see-through HMD, every time an image of the real space is acquired from a camera as an image capturing device incorporated in the HMD, a position and an orientation of the camera, in the real space at the time of image capturing, are measured. Then, CG, rendered based on the position and the orientation of the camera and a unique parameter of the camera including a focal length and the like, is overlapped on the image of the real space.

When the video see-through HMD is used, image information can be used for positioning. The image information includes an index, such as a marker and an edge, captured by the camera incorporated in the HMD. A feature of the index, when using the image information from the camera for the positioning as described above, is difficult to accurately detect, when an image is unclear. The image may becomes unclear when the user, who is wearing the HMD and experiencing MR, moves too fast or shakes the user's head too fast, resulting in a high moving velocity of the camera in the HMD.

Japanese Patent Application Laid-Open No. 2003-70006 discusses a technique relating to the moving velocity of the camera. More specifically, a white balance of the captured image is adjusted through gain adjustment, based on a white balance adjustment coefficient stored in a memory, in accordance with a shifted amount of the orientation of the camera.

However, when the positioning method using the image information is employed, an index in the captured image might be blurred or out of focus when the user wearing the HMD moves too fast or shakes the user's head too fast. An appropriate image might not be obtained even by performing the image adjustment described above, if the moving velocity of the user is too high. When the appropriate image cannot be obtained as described above, the positioning using the index cannot be appropriately performed.

Accordingly, there is a need for a technique capable of preventing an accuracy degradation of positioning processing by making a user aware of a moving velocity of an image capturing unit

SUMMARY OF THE INVENTION

According to an aspect of the present invention, an information processing apparatus configured to generate an image to be displayed on a display device including an image capturing unit, includes an image acquisition unit configured to acquire a captured image obtained by the image capturing unit, an estimation unit configured to estimate a position and an orientation of the image capturing unit based on the captured image, a first generation unit configured to generate an image of a virtual object based on the estimated position and orientation of the image capturing unit, a moving velocity acquisition unit configured to acquire a moving velocity of the image capturing unit, a second generation unit configured to generate an image representing the moving velocity; and a display control unit configured to cause the display device to display a composite image obtained by combining the image of the virtual object generated by the first generation unit and the image generated by the second generation unit.

According to the present disclosure, the accuracy degradation of positioning processing can be prevented by making a user aware of a moving velocity of an image capturing unit.

Further features of the present invention will become apparent from the following description of exemplary embodiments with reference to the attached drawings.

DESCRIPTION OF THE EMBODIMENTS

Exemplary embodiments of the present invention will be described below with reference to the drawings.

Figure 1:
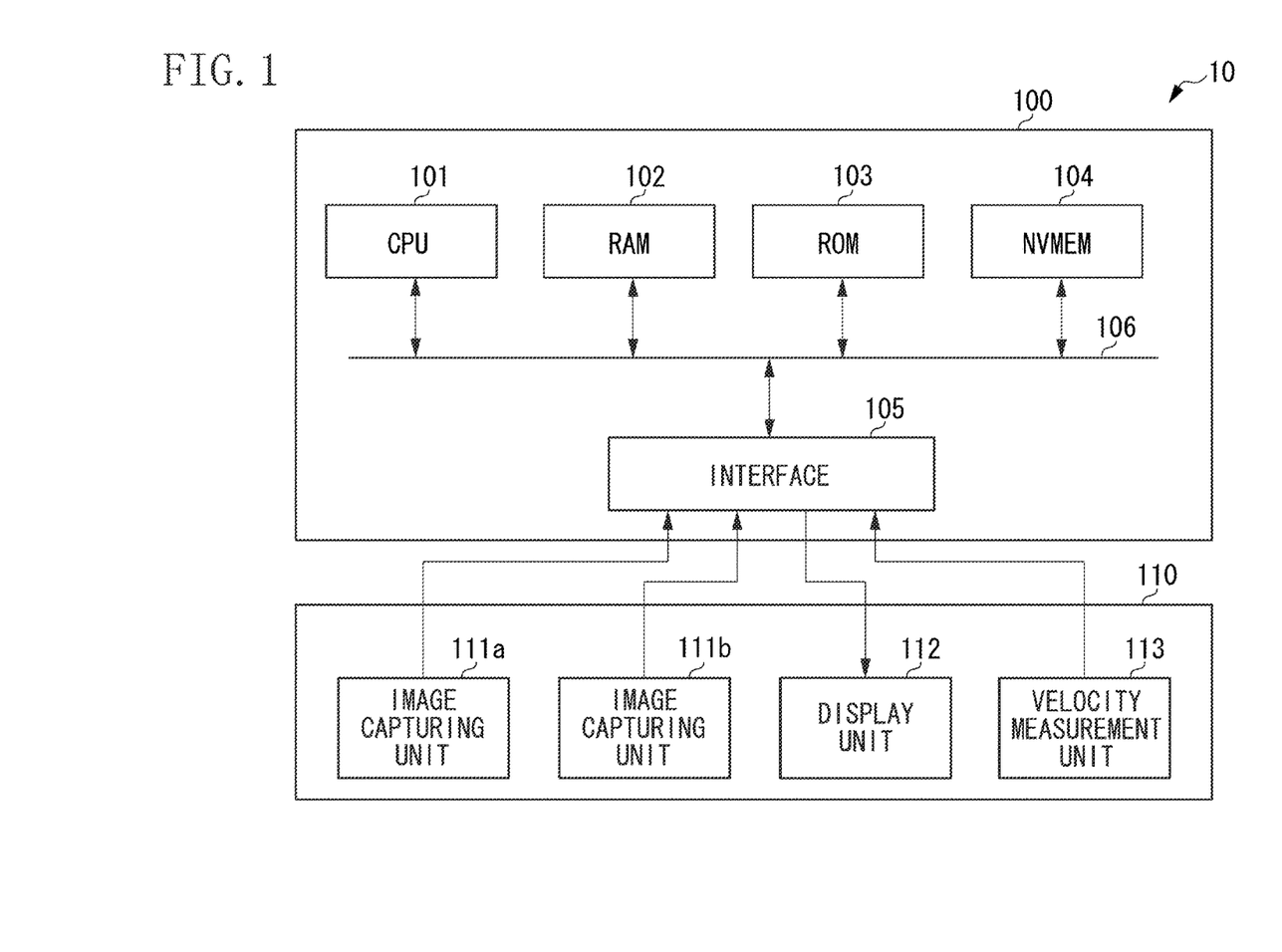
FIG. 1 is a block diagram illustrating a display system.

FIG. 1 is a block diagram illustrating a display system 10 according to the present exemplary embodiment. The display system 10 includes an information processing apparatus 100 and a head mounted display (HMD) 110. The information processing apparatus 100 and the HMD 110 are connected to each other through wireless communications. The HMD 110 is a video see-through HMD. The information processing apparatus 100 includes a central processing unit (CPU) 101, a random access memory (RAM) 102, a read only memory (ROM) 103, a non-volatile memory (NVMEM) 104, an interface 105, and a system bus 106. The CPU 101 executes a program stored in the ROM 103 by using the RAM 102 as a work memory, and performs overall control on components described below via the system bus 106. With this configuration, various types of processing described below are implemented.

The NVMEM 104 is a rewritable nonvolatile memory and serves as a secondary memory storage device. The CPU 101 writes and reads data to and from the NVMEM 104. The secondary storage device may be a flash memory, a hard disk drive (HDD), or may be a storage device such as an optical disk drive. The interface 105 transmits and receives data to and from external devices such as an image capturing unit 111, a display unit 112, and a velocity measurement unit 113 described below. Functions and processing of the information processing apparatus 100 that are described below are implemented by the CPU 101 reading and executing a program stored in the ROM 103 or the NVMEM 104.

The HMD 110 includes two image capturing units 111a and 111b, a display unit 112, and a velocity measurement unit 113. In the description below, the two image capturing units 111a and 111b are referred to as the image capturing unit 111 as appropriate in some cases. The image capturing unit 111 is a camera for capturing an image of an index. The display unit 112 is configured of a cathode ray tube (CRT), a liquid crystal display, or the like, and can display various types of information in forms of image, characters, and/or the like. The velocity measurement unit 113 is a sensor that measures a moving velocity of the image capturing unit 111, and can input velocity information to the CPU 101. For example, the velocity measurement unit 113 according to the present exemplary embodiment uses, for example, a gyro sensor to measure angular velocity as the moving velocity. In the present exemplary embodiment, the image capturing unit 111, the display unit 112, and the velocity measurement unit 113 are incorporated in the HMD 110. Alternatively, the image capturing unit 111, the display unit 112, and the velocity measurement unit 113 are not necessarily incorporated in the HMD 110 and may be externally provided.

Figure 2:
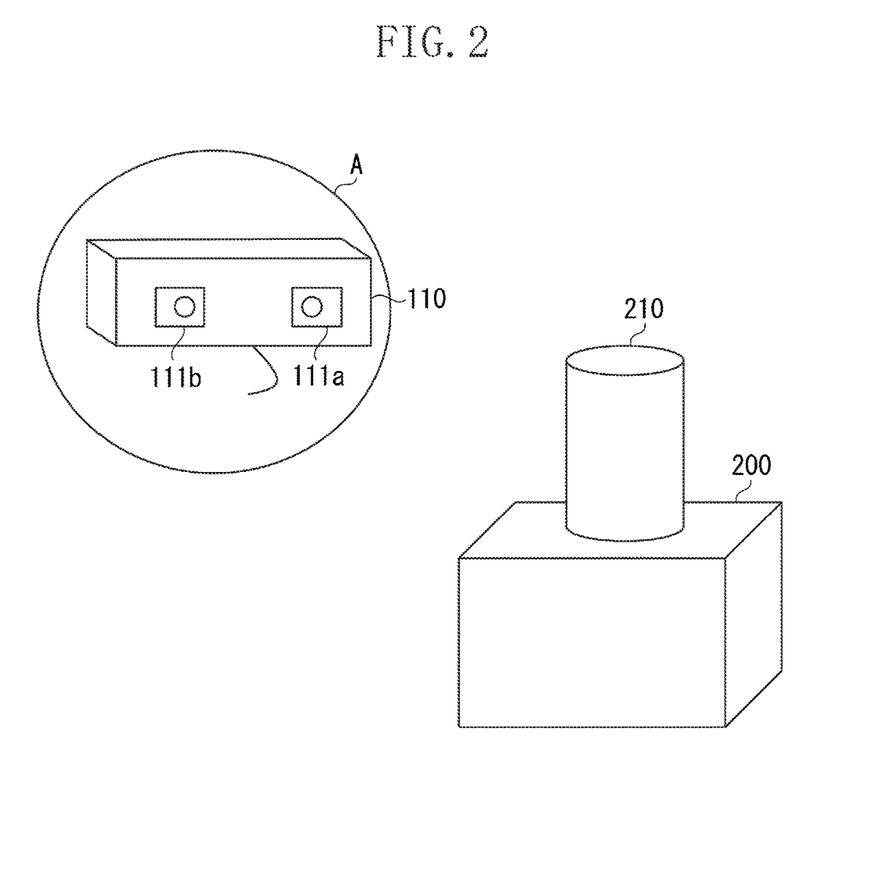
FIG. 2 is a schematic diagram illustrating a head mounted display (HMD) and a space seen by a user wearing the HMD.

FIG. 2 is a schematic diagram illustrating the HMD 110 and a space viewed by a user wearing the HMD 110. The HMD 110 is worn by a user A. The HMD 110 incorporates the image capturing units 111a and 111b respectively corresponding to left and right eyes. The image capturing units 111a and 111b each capture a moving image of a real space including a monitoring target object 200 in the real space. Frames of images captured by the image capturing units 111a and 111b are sequentially input to the information processing apparatus 100. The information processing apparatus 100 calculates a position and an orientation of the image capturing unit 111 based on the image input from the image capturing units 111a and 111b, and three-dimensional model data of the monitoring target object 200 stored in a model data storage unit 303 described below.

Based on the calculated position and the orientation of the image capturing unit 111, the information processing apparatus 100 renders an image of a virtual object 210 on an image of a frame used for a calculation in an overlapping manner, whereby a composite image is generated. The information processing apparatus 100 outputs the generated composite image to the display unit 112 of the HMD 110. In this way, the composite image, in which the virtual object 210 is overlapped on the monitoring target object 200, is displayed on the display unit 112. The display unit 112 of the HMD 110 is attached to the HMD 110 in such a manner as to be positioned before the eyes of the user A wearing the HMD 110. Therefore, the composite image is displayed in front of the eyes of the user A. The angular velocity measured by the velocity measurement unit 113 is a result of a head shaking action and the like of the user A.

Figure 3:
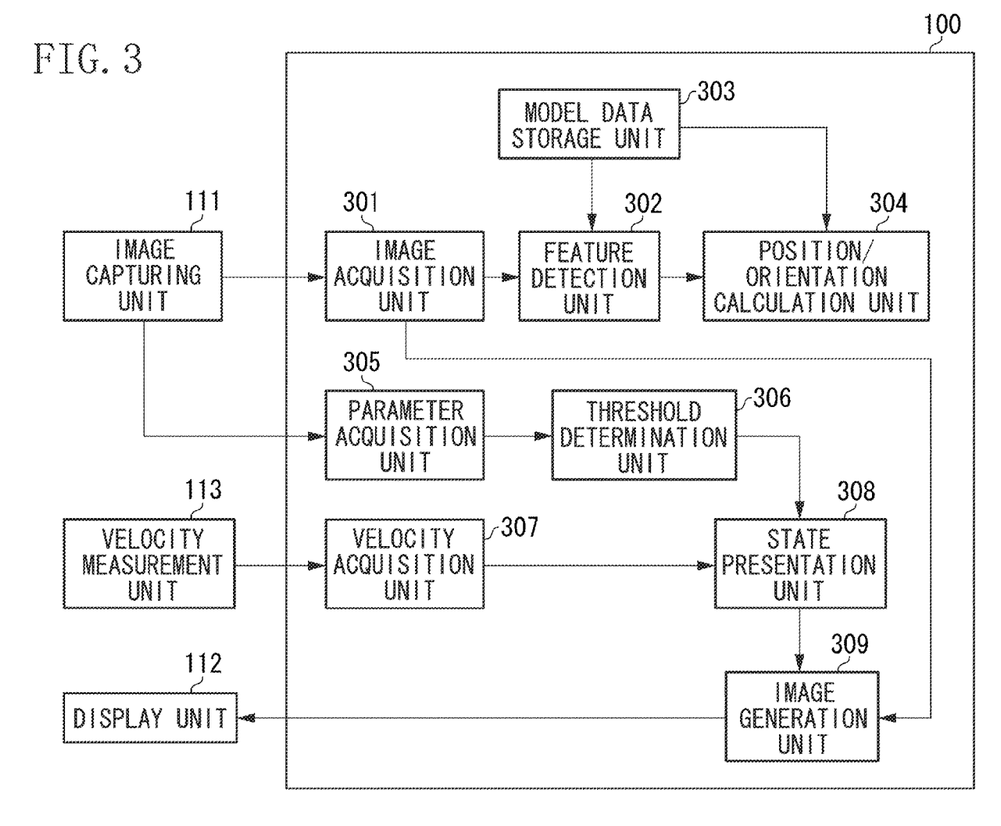
FIG. 3 is a block diagram illustrating a functional configuration of an information processing apparatus.

FIG. 3 is a block diagram illustrating a functional configuration of the information processing apparatus 100. An image acquisition unit 301 receives images (real space images) of frames sequentially output from the image capturing unit 111, and transfers the images to a feature detection unit 302 on the subsequent stage. For example, when the information processing apparatus 100 uses a file of a moving image of the real space stored in advance in the NVMEM 104 and the like, the image acquisition unit 301 executes processing of reading the file and of transferring the file to the feature detection unit 302 on the subsequent stage. Upon receiving the image from the image acquisition unit 301, the feature detection unit 302 detects an image feature used for calculating the position and the orientation of the image capturing unit 111, from the image. More specifically, the feature detection unit 302 detects a predetermined index including a marker artificially disposed in the real space for identifying the position of the HMD 110 and a natural feature, such as a corner point and an edge, originally existing in the real space.

The model data storage unit 303 stores therein three-dimensional model data of the monitoring target object 200 used as a reference for calculating the position and the orientation of the image capturing unit 111. For example, the model data storage unit 303 is a region in the RAM 102. A position/orientation calculation unit 304 calculates the position and the orientation of the image capturing unit 111 on a coordinate system with the monitoring target object 200 serving as a reference (hereinafter, referred to as a reference coordinate system). The calculation is based on the image feature detected by the feature detection unit 302 and the model data stored in the model data storage unit 303.

A parameter acquisition unit 305 acquires an image capturing parameter from the image capturing unit 111 (parameter acquisition processing). The image capturing parameter is a parameter employed for capturing the images corresponding to the frames of images captured by and sequentially output from the image capturing unit 111. Specific examples of the image capturing parameter include values of shutter speed, gain, and the like. In the present exemplary embodiment, the value of the shutter speed is acquired. The parameter acquisition unit 305 writes the acquired image capturing parameter in a region (not illustrated) in the RAM 102. Each time the image capturing parameter is newly acquired, the parameter acquisition unit 305 transmits an update notification of the image capturing parameter to a threshold determination unit 306. When a function such as auto exposure (AE) is operating in the image capturing unit 111, the image capturing parameter such as the shutter speed varies in accordance with the image capturing condition. In this case, the parameter acquisition unit 305 acquires the image capturing parameter each time the image frame is output from the image capturing unit 111.

Upon receiving the update notification from the parameter acquisition unit 305, the threshold determination unit 306 refers to the image capturing parameter acquired by the parameter acquisition unit 305. The threshold determination unit 306 determines a threshold of the moving velocity of the image capturing unit 111 based on the image capturing parameter. The threshold is an upper limit value of the moving velocity. The position and the orientation of the image capturing unit 111 can be accurately estimated as long as the moving velocity is at or below the threshold. The threshold determination unit 306 writes the determined threshold in a region in the RAM 102. The processing executed by the threshold determination unit 306 is described in detail with reference to FIG. 4.

A velocity acquisition unit 307 acquires the moving velocity measured by the velocity measurement unit 113 (i.e., moving velocity acquisition processing). The velocity measurement unit 113 is disposed adjacent to the image capturing unit 111 in the HMD 110 to be capable of measuring a velocity that is approximately the same as that of the image capturing unit 111. The velocity acquisition unit 307 reads a measurement value of the moving velocity from the velocity measurement unit 113, and writes the value in a region (not illustrated) in the RAM 102. The velocity acquisition unit 307 periodically acquires the measurement value in synchronization with a measurement update timing of the velocity measurement unit 113. When the measurement value of the moving velocity is updated, the velocity acquisition unit 307 transmits an update notification to a state presentation unit 308.

The state presentation unit 308 reads the threshold determined by the threshold determination unit 306, and the measurement value of the moving velocity acquired by the velocity acquisition unit 307, from the RAM 102, and generates state information based on these pieces of information. The state information is information for notifying the user of a state relating to the movement of the image capturing unit 111. Processing executed by the state presentation unit 308 is described below with reference to FIG. 6. An image generation unit 309 generates a composite image in which a virtual object is overlapped on the image frame acquired by the image acquisition unit 301. The image generation unit 309 generates a composite image in which the state information generated by the state presentation unit 308 is further overlapped on the composite image. The image generation unit 309 performs control so as to output the generated composite image to the display unit 112.

Figure 4:
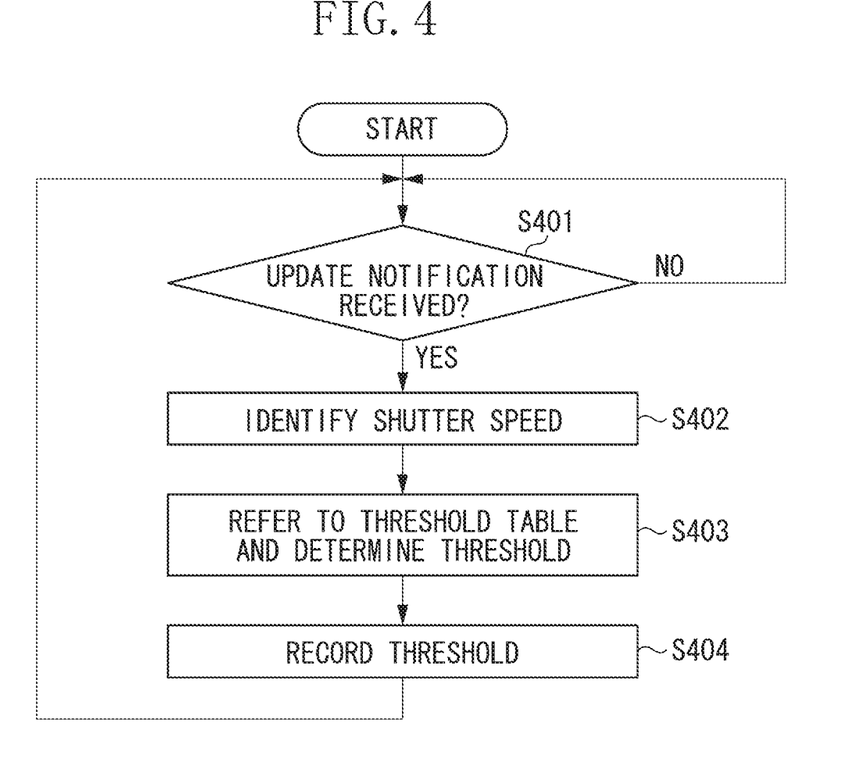
FIG. 4 is a flowchart illustrating threshold determination processing.

FIG. 4 is a flowchart illustrating the threshold determination processing executed by the threshold determination unit 306. In step S401, the threshold determination unit 306 waits until the update notification of the image capturing parameter is received from the parameter acquisition unit 305. When the threshold determination unit 306 receives the update notification (Yes in step S401), the processing proceeds to step S402. In step S402, the threshold determination unit 306 identifies the shutter speed from the image capturing parameter stored in the RAM 102.

Figure 5:
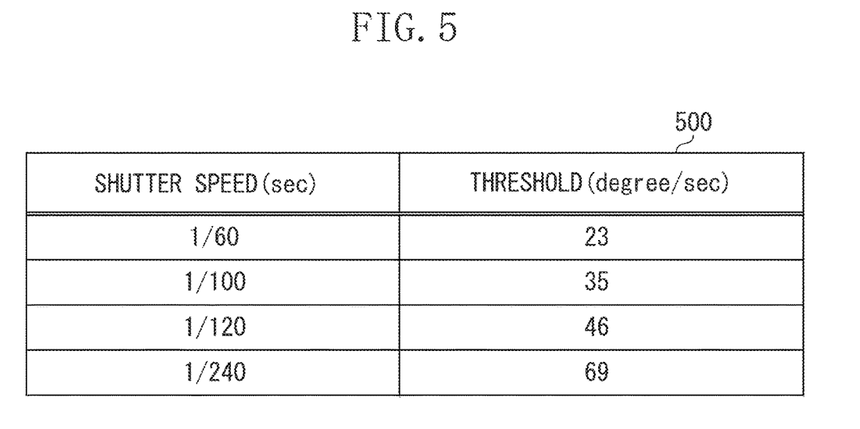
FIG. 5 is a diagram illustrating an example of a threshold table.

Then, in step S403, the threshold determination unit 306 refers to the threshold table, and determines the threshold based on the shutter speed (threshold determination processing). FIG. 5 is a diagram illustrating an example of a threshold table 500. In the threshold table 500, the shutter speed and the threshold of the moving velocity (angular velocity) are stored while being associated with each other. There is a lower chance of video blurring with higher shutter speed. Accordingly, a higher threshold is associated with higher shutter speed in the threshold table 500. For example, the threshold table 500 is stored in advance in the NVMEM 104. The threshold table 500 is an example of association information associating the shutter speed and the threshold with each other.

For example, when the shutter speed is ⅟₁₂₀ (sec), the threshold determination unit 306 refers to the threshold table 500 and determines 46 (degrees/sec) corresponding to the threshold of the shutter speed. In the present exemplary embodiment, the angular velocity is described as an example of the moving velocity. Alternatively, the moving velocity may be velocity corresponding to other kinds of movement such as moving speed.

Referring back to FIG. 4, after the processing in step S403, in step S404, the threshold determination unit 306 writes the determined threshold in the region in the RAM 102. Then, the processing returns to step S401, and the threshold determination unit 306 repeats the processing in and after step S401.

Figure 6:
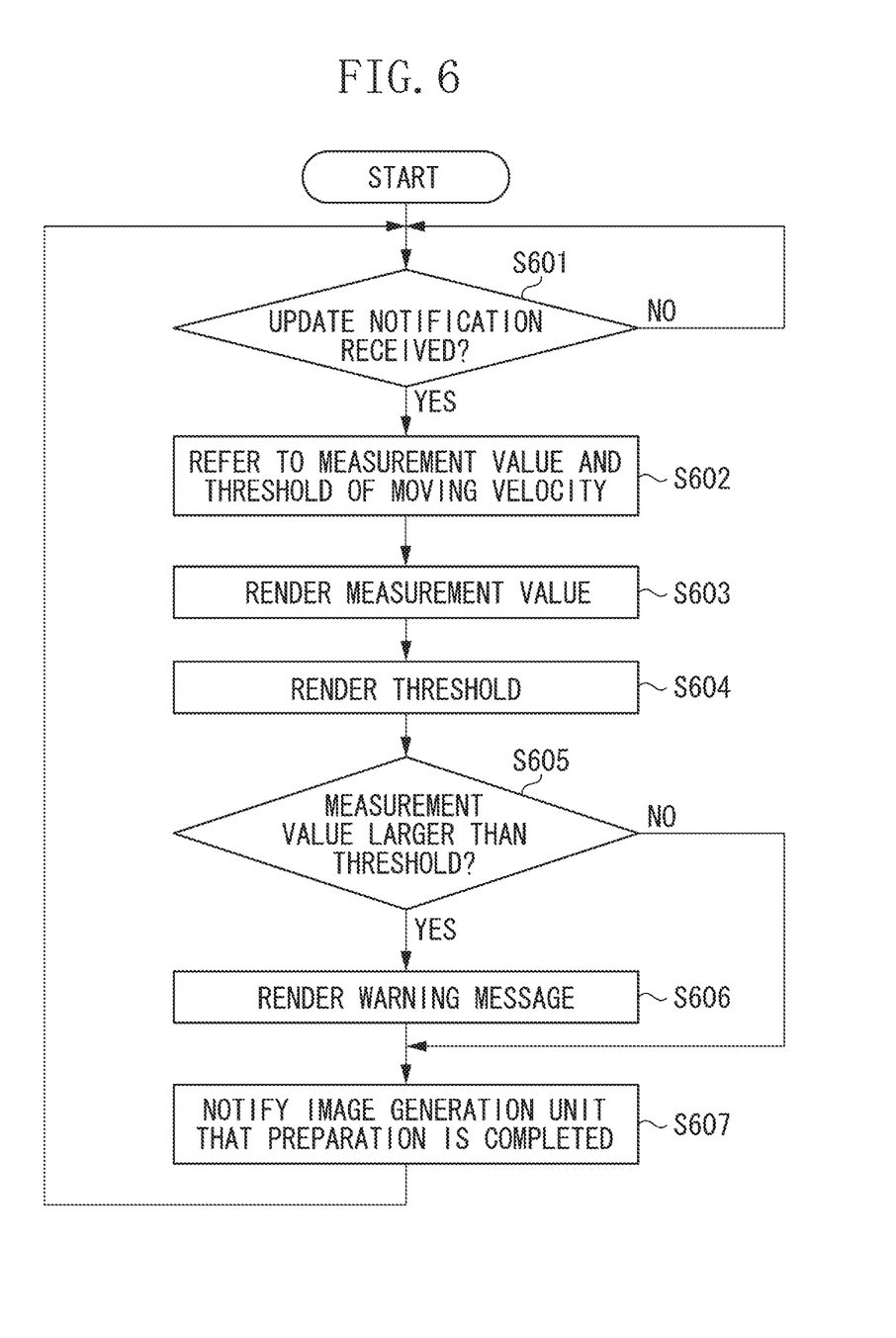
FIG. 6 is a flowchart illustrating state information generation processing.

FIG. 6 is a flowchart illustrating the state information generation processing executed by the state presentation unit 308. In step S601, the state presentation unit 308 waits until the update notification of the measurement value of the moving velocity is received from the velocity acquisition unit 307. When the state presentation unit 308 receives the update notification (Yes in step S601), the processing proceeds to step S602. In step S602, the state presentation unit 308 refers to the measurement value and the threshold written in the RAM 102. Then, in step S603, the state presentation unit 308 renders the measurement value of the moving velocity on a rendering area in the RAM 102. Then, in step S604, the state presentation unit 308 similarly renders the threshold on the rendering area in the RAM 102.

Then, in step S605, the state presentation unit 308 compares the measurement value of the moving velocity with the threshold. When the state presentation unit 308 determines that the measurement value is larger than the threshold (Yes in step S605), the processing proceeds to step S606. On the other hand, when the state presentation unit 308 determines that the measurement value is not larger than the threshold (No in step S605), the processing proceeds to step S607. In step S606, the state presentation unit 308 additionally renders a warning message on the rendering area of the RAM 102 on which the measurement value of the moving velocity and the threshold have been rendered in steps S603 and S604. Thus, generation of rendering data as the state information for notifying the user of the state is completed. The processing in step S603, S604, and S606 is an example of generation processing of generating the state information. Next, in step S607, the state presentation unit 308 notifies the image generation unit 309 that preparation for rendering is completed. Then, the processing returns to step S601.

The rendering data rendered by the state presentation unit 308 as described above is transmitted to the image generation unit 309. The image generation unit 309 renders the rendering data on the image of the image frame acquired by the image acquisition unit 301 in an overlapping manner, whereby the composite image is generated. Then, the image generation unit 309 performs control so as to output the composite image to the display unit 112 (output control processing).

Figure 7A:
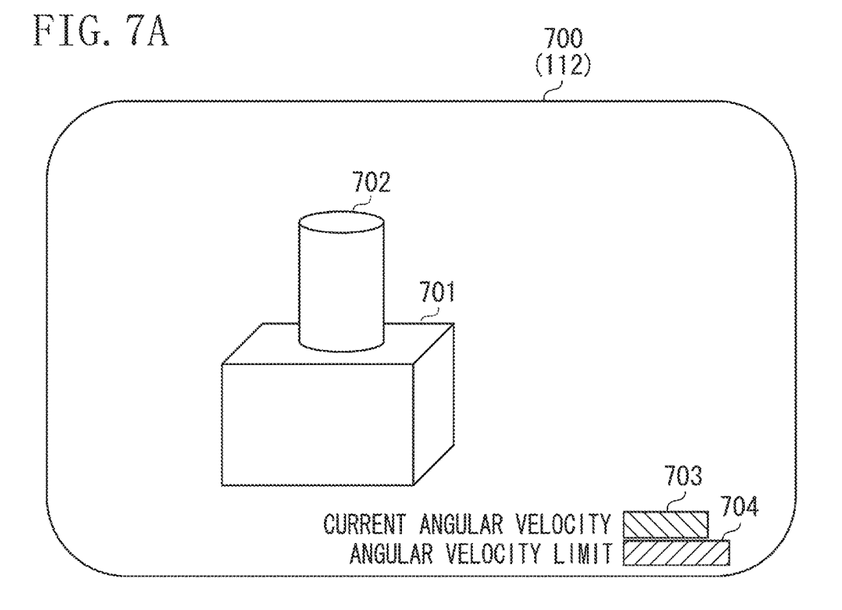
FIGS. 7A and B are diagrams each illustrating an example of a composite image.
Figure 7B:
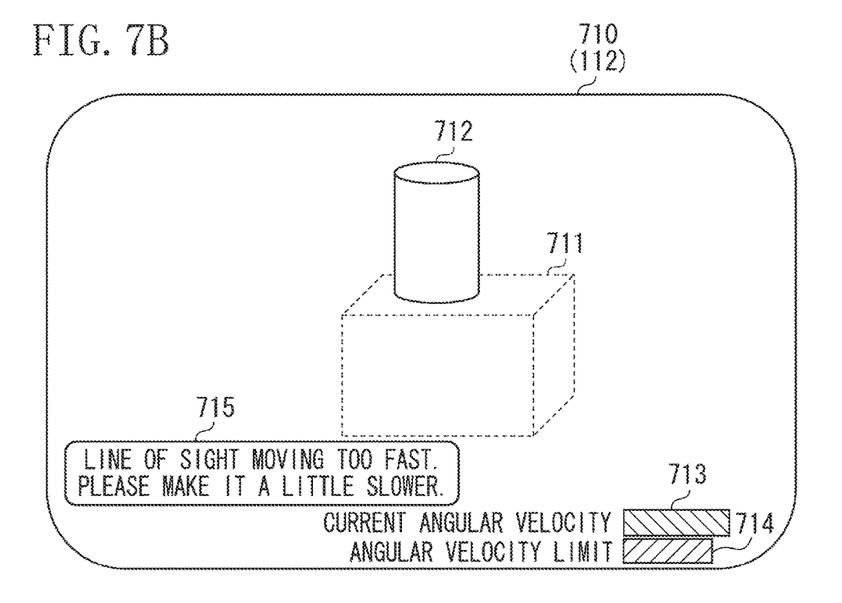

FIGS. 7A and 7B are diagrams each illustrating an example of the composite image displayed on the display unit 112. A composite image 700 illustrated in FIG. 7A is an image generated when the measurement value is not larger than the threshold. A composite image 710 illustrated in FIG. 7B is an image generated when the measurement value is larger than the threshold. The composite image 700 includes a captured image (video) 701 of the monitoring target object 200 existing in the real space and an image 702 of the virtual object 210. The composite image 700 further includes a measurement value 703 rendered in step S603 and a threshold 704 rendered in step S604. As described above, in the present exemplary embodiment, the moving velocity is an angular velocity, and thus the measured angular velocity is displayed as the measurement value 703. The displayed threshold 704 is an upper limit of the angular velocity. The position and the orientation of the HMD 110 can be accurately estimated by the information processing apparatus 100, as long as the angular velocity is at or below the threshold 704.

As described above, in the display system 10 according to the present exemplary embodiment, when the measurement value of the moving velocity does not exceed the threshold, the measurement value 703 and the threshold 704 are displayed on the display unit 112 of the HMD 110. Thus, the user A wearing the HMD 110 can recognize the moving velocity and the threshold displayed on the display unit 112, and can be careful so that the user's moving velocity does not exceed the threshold.

As illustrated in FIG. 7B, the composite image 710 includes a captured image (video) 711 of the monitoring target object 200 and the image 702 of the virtual object 210. In the composite image 710, the captured image 711 of the monitoring target object 200 is blurred because the moving velocity of the user A is too high to appropriately capture an image of the monitoring target object 200. Because the captured image 711 of the monitoring target object 200 is not appropriately captured, the positional relationship between the virtual object 210 and the monitoring target object 200 is different from the appropriate positional relationship illustrated in FIG. 2. The composite image 710 further includes the measurement value 713 rendered in step S603, the threshold 714 rendered in step S604, and the warning message 715 rendered in step S606. The warning message 715 is information notifying the user that the moving velocity exceeds the threshold, and thus can suggest the user to move a little slower.

As described above, in the display system 10 according to the present exemplary embodiment, not only the measurement value 713 and the threshold 714 but also the warning message 715 is displayed on the display unit 112, when the measurement value of the moving velocity exceeds the threshold. With this operation, the user A can recognize that the moving velocity and the threshold displayed on the display unit 112, d can be careful to move a little slower.

As described above, the display system 10 according to the present exemplary embodiment can prevent an accuracy degradation of positioning processing by making a user aware of the moving velocity of an image capturing unit.

In a first modification of the display system 10 according to the present exemplary embodiment, the state information is not limited to that in the exemplary embodiment. Another example of the state information includes voice information. In such a case, the HMD 110 receives the voice information as the state information, and outputs the voice information though a speaker (not illustrated). More specifically, in this case, the HMD 110 outputs the measurement value of the moving velocity and the threshold through voice. When the moving velocity exceeds the threshold, the HMD 110 outputs the warning message through voice. The timing of outputting the measurement value of the moving velocity and the threshold is not particularly limited.

Still another example of the state information may include information instructing vibration generation. In such a case, the information processing apparatus 100 generates the state information instructing the vibration generation when the moving velocity exceeds the threshold, and transmits the state information to the HMD 110. Upon receiving the state information, the HMD 110 drives a vibration unit (not illustrated), so that a main body of the HMD 110 will vibrate. With this operation, the user can recognize whether the moving velocity is appropriate based on whether the main body is vibrating.

In a second modification, the HMD 110 may be integrally formed with the information processing apparatus 100. The processing of generating state information and the like, executed by the information processing apparatus 100 in the above-described exemplary embodiment, may be executed by the HMD 110. In such a case, a CPU of the HMD 110 performs control of displaying a composite image, in which the measurement value, the threshold, and the warning message are overlapped as appropriate, on the display unit 112 (display control processing).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-206453, filed Oct. 20, 2015, which is hereby incorporated by reference herein in its entirety.

What is claimed is:

1. An information processing apparatus configured to generate an image to be displayed on a display device including an image capturing unit, the information processing apparatus comprising:
   an image acquisition unit configured to acquire a captured image obtained by the image capturing unit;
   an estimation unit configured to estimate a position and an orientation of the image capturing unit based on the captured image;
   a first generation unit configured to generate an image of a virtual object based on the estimated position and orientation of the image capturing unit;
   a moving velocity acquisition unit configured to acquire a current moving velocity of the image capturing unit and a limit of the moving velocity;
   a second generation unit configured to generate an image representing the current moving velocity in contradistinction to the limit of the moving velocity; and
   a display control unit configured to cause the display device to display a composite image obtained by combining the image of the virtual object and the image representing the current moving velocity in contradistinction to the limit of the moving velocity.

2. The information processing apparatus according to claim 1, further comprising a determination unit configured to determine the threshold, based on an image capturing parameter of the image capturing unit.

3. The information processing apparatus according to claim 2, wherein the image capturing parameter is a shutter speed of the image capturing unit.

4. The information processing apparatus according to claim 2, wherein the determination unit is configured to determine the threshold based on association information in which a measurement value of the image capturing parameter and the threshold are associated.

5. The information processing apparatus according to claim 4, further comprising a presentation unit configured to generate warning information when the measurement value exceeds the threshold, and present the warning information to a user monitoring the display device.

6. The information processing apparatus according to claim 5, wherein the presentation unit further combines an image representing the warning information with the composite image.

7. The information processing apparatus according to claim 4, wherein the presentation unit is configured to present the warning information to the user through voice.

8. The information processing apparatus according to claim 1, wherein the composite image is an image obtained by combining the captured image, the image of the virtual object generated by the first generation unit, and the image generated by the second generation unit.

9. The information processing apparatus according to claim 1, wherein the display device is an optical see-through or video see-through display device.

10. The information processing apparatus according to claim 1, wherein the moving velocity acquisition unit is a gyro sensor.

11. The information processing apparatus according to claim 1, wherein the display device is mounted to a part of a human body.

12. A system comprising:
a display device; and
an information processing apparatus connected to the display device,
wherein the display device includes:
an image capturing unit configured to capture an image of a real space;
a first transmission unit configured to transmit the image captured by the image capturing unit to the information processing apparatus; and
a display unit configured to receive the image transmitted from the information processing apparatus and display the image, and
wherein the information processing apparatus includes:
an image acquisition unit configured to acquire the captured image from the display device;
an estimation unit configured to estimate a position and an orientation of the image capturing unit based on the captured image;
a first generation unit configured to generate an image of a virtual object based on the estimated position and orientation of the image capturing unit;
a moving velocity acquisition unit configured to acquire a current moving velocity of the image capturing unit and a limit of the moving velocity;
a second generation unit configured to generate an image representing the current moving velocity in contradistinction to the limit of the moving velocity; and a second transmission unit configured to transmit, to the display device, a composite image obtained by combining the image of the virtual object and the image representing the current moving velocity in contradistinction to the limit of the moving velocity;
a moving velocity acquisition unit configured to acquire a current moving velocity of the image capturing unit and a limit of the moving velocity;
a second generation unit configured to generate an image representing the current moving velocity in contradistinction to the limit of the moving velocity; and
a display control unit configured to cause the display device to display a composite image obtained by combining the image of the virtual object and the image representing the current moving velocity in contradistinction to the limit of the moving velocity.

13. An information processing method for generating an image to be displayed on a display device including an image capturing unit, the information processing method comprising:
acquiring a captured image obtained by the image capturing unit;
estimating a position and an orientation of the image capturing unit based on the captured image;
generating an image of a virtual object based on the estimated position and orientation of the image capturing unit;
acquiring a current moving velocity of the image capturing unit and a limit of the moving velocity;
generating an image representing the current moving velocity in contradistinction to the limit of the moving velocity; and
causing the display device to display a composite image obtained by combining the image of the virtual object and the image representing the current moving velocity in contradistinction to the limit of the moving velocity.

14. A storage medium storing a program for causing a computer to perform an information processing method for generating an image to be displayed on a display device including an image capturing unit, the information processing method comprising:
acquiring a captured image obtained by the image capturing unit;
estimating a position and an orientation of the image capturing unit based on the captured image;
generating an image of a virtual object based on the estimated position and orientation of the image capturing unit;
acquiring a current moving velocity of the image capturing unit and a limit of the moving velocity;
generating an image representing the current moving velocity in contradistinction to the limit of the moving velocity; and
causing the display device to display a composite image obtained by combining the image of the virtual object and the image representing the current moving velocity in contradistinction to the limit of the moving velocity.

* * * * *